(12) United States Patent
Chen

(10) Patent No.: US 6,475,611 B1
(45) Date of Patent: Nov. 5, 2002

(54) SI-CONTAINING SEEDLAYER DESIGN FOR MULTILAYER MEDIA

(75) Inventor: Ga-Lane Chen, Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 30 days.

(21) Appl. No.: 09/634,253

(22) Filed: Aug. 7, 2000

Related U.S. Application Data

(60) Provisional application No. 60/170,854, filed on Dec. 14, 1999.

(51) Int. Cl.[7] .............. G11B 5/66; G11B 5/70; C23C 14/06; C23C 14/34
(52) U.S. Cl. ........... 428/213; 428/336; 428/694 TS; 428/694 TM; 428/900; 204/192.15; 204/192.2
(58) Field of Search .......... 428/694 TM, 694 TS, 428/336, 900, 213; 204/192.2, 192.1, 192.12, 192.15

(56) References Cited

U.S. PATENT DOCUMENTS

| | | | |
|---|---|---|---|
| 5,202,862 A | * 4/1993 | Ohta et al. ............... 369/13 |
| 5,565,266 A | * 10/1996 | Hatwar et al. ............. 428/332 |
| 5,599,632 A | 2/1997 | Cheng et al. ............. 427/131 |
| 5,660,930 A | 8/1997 | Bertero .................. 428/332 |
| 5,693,426 A | 12/1997 | Lee ...................... 428/611 |
| 5,800,863 A | 9/1998 | Cheng et al. ............. 428/457 |

* cited by examiner

*Primary Examiner*—Paul Thibodeau
*Assistant Examiner*—Holly C. Rickman
(74) *Attorney, Agent, or Firm*—Morrison & Foerster LLP

(57) ABSTRACT

A multilayer superlattice having a structure with many interfaces of magnetic/non-magnetic layers could increase the coercivity of a magnetic recording medium by increasing the interfacial anisotropy. A Si-containing seedlayer between a soft underlayer and the multilayer superlattice further boosts the coercivity of the magnetic recording medium.

15 Claims, 2 Drawing Sheets

SI-CONTAINING SEEDLAYER DESIGN FOR MULTILAYER MEDIA

RELATED APPLICATIONS

This application claims priority from provisional No. 60/170,854 filed Dec. 14, 1999, entitled "Si SEEDLAYER DESIGN FOR MULTILAYER MEDIA," the entire disclosure of which is hereby incorporated herein by reference.

TECHNICAL FIELD

This invention relates to a magnetic medium, such as a thin film magnetic recording medium, and the method of manufacturing the medium. The invention has particular applicability to a magnetic recording medium exhibiting low noise, high coercivity and suitable for high-density longitudinal and perpendicular recording.

BACKGROUND ART

The requirements for high areal density impose increasingly greater requirements on magnetic recording media in terms of coercivity, remanent squareness, low medium noise and narrow track recording performance. It is extremely difficult to produce a magnetic recording medium satisfying such demanding requirements, particularly a high-density magnetic rigid disk medium for longitudinal and perpendicular recording. The magnetic anisotropy of longitudinal and perpendicular recording media makes the easily magnetized direction of the media located in the film plane and perpendicular to the film plane, respectively. The remanent magnetic moment of the magnetic media after magnetic recording or writing of longitudinal and perpendicular media is located in the film plane and perpendicular to the film plane, respectively.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material which comprise a mixture of amorphous and crystalline materials, and ceramic materials. Glass-ceramic materials do not normally exhibit a crystalline surface. Glasses and glass-ceramics generally exhibit high resistance to shocks.

A conventional longitudinal recording disk medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat (not shown) to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disk medium is similar to the longitudinal recording medium depicted in FIG. 1, but does not comprise Cr-containing underlayers.

Conventional methods for manufacturing longitudinal magnetic recording medium with a glass or glass-ceramic substrate comprise applying a seed layer between the substrate and underlayer. A conventional seed layer seeds the nucleation of a particular crystallographic texture of the underlayer.

Conventional Cr-alloy underlayers comprise vanadium (V), titanium (Ti), tungsten (W) or molybdenum (Mo). Other conventional magnetic layers are CoCrTa, CoCrPtB, CoCrPt, CoCrPtTaNb and CoNiCr.

The seed layer, underlayer, and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

The linear recording density could be increased by increasing the coercivity of the magnetic recording medium. However, this objective could only be accomplished by decreasing the medium noise, as by maintaining very fine magnetically noncoupled grains. As the recording areal density increases, conventional magnetoresistive (MR) disks have smaller grain size, which induces superparamagnetic limit and causes the collapse of medium coercivity and magnetic remanance. Also, conventional sputtered media rely on the magnetic alloy composition to increase volume anisotropy.

There exists a need for technology enabling the use of a structure that could increase the medium coercivity by increasing the interfacial anisotropy.

SUMMARY OF THE INVENTION

During the course of the present invention, it was found that a multilayer superlattice having a structure with many interfaces of magnetic/non-magnetic layers could increase the medium coercivity by increasing the interfacial anisotropy and the use of Si-containing seedlayer further boosts the coercivity.

The present invention is a magnetic recording medium comprising a substrate, a multilayer superlattice having a structure with many interfaces of magnetic/non-magnetic layers and a Si-containing seedlayer interposed between the substrate and the multilayer superlattice.

An embodiment of the present invention is a method of manufacturing a magnetic recording medium, the method comprising sputter depositing a Si-containing seedlayer on a substrate; and sputter depositing a multilayer superlattice comprising a magnetic layer and a non-magnetic layer.

Another embodiment of this invention is a magnetic recording medium comprising a substrate; a multilayer superlattice comprising a magnetic layer and a non-magnetic layer and a means for boosting the coercivity of the magnetic recording medium. Embodiments of the Si-containing seedlayer include any layer containing Si, including a sputter deposited layer consisting essentially of Si. Embodiments of the means for boosting the coercivity of the magnetic recording medium include, but are not limited to, a layer of a Si-containing material, Pd, CoCr, CrW, NiNb or NiP or a material consisting essentially of Si. In a preferred embodiment, the Si-containing seedlayer is sputter deposited on a soft magnetic underlayer.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments and its several details are capable of modifications in various obvious respects, all without departing from the present invention. The drawings and description are to be regarded as illustrative in nature, and not as restrictive.

DESCRIPTION OF THE INVENTION

Figure 1:
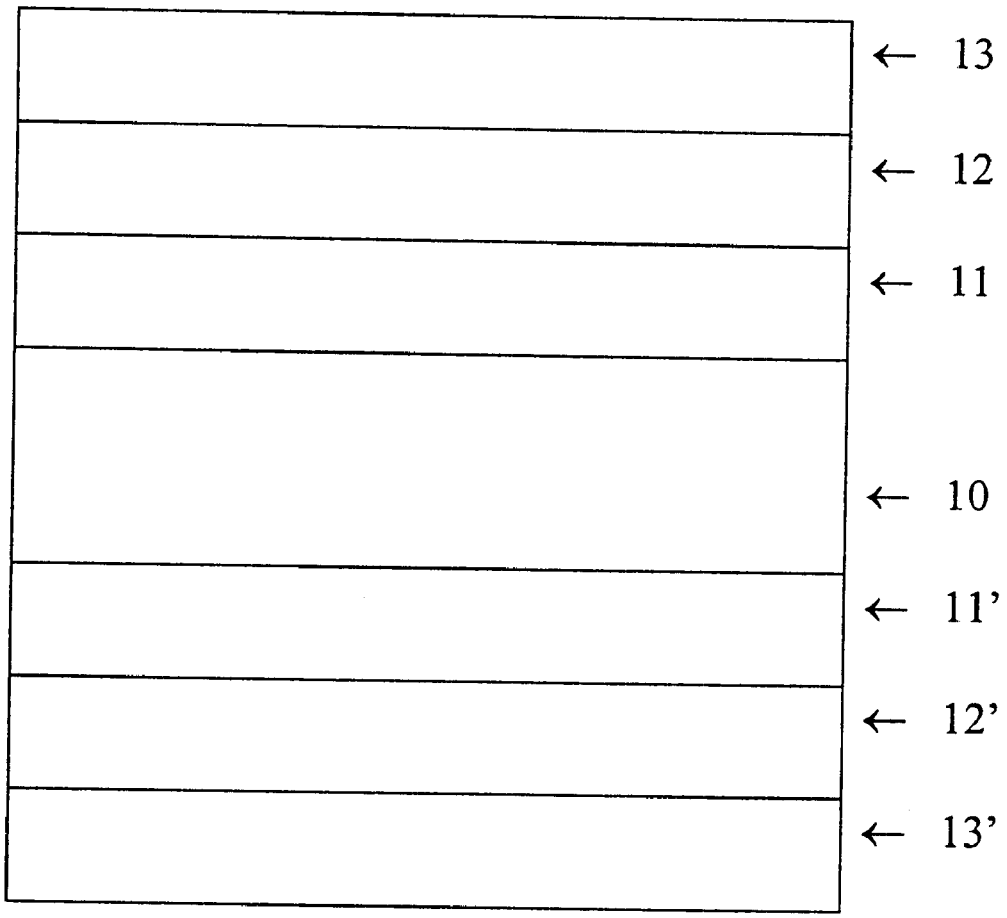
FIG. 1 schematically shows a conventional magnetic recording medium structure (Prior Art).

The present invention enables the manufacture of magnetic recording media comprising a multilayer superlattice and exhibiting high coercivity. This media is suitable for high-density longitudinal and perpendicular magnetic recording. The anisotropy of the media could be increased by multilayer interfacial anisotropy.

These objects of this invention are achieved in accordance with the embodiments by strategically forming a Si-containing seedlayer on a substrate of media comprising the multilayer superlattice. The Si-containing seedlayer could be sputter deposited directly on the substrate or on a soft underlayer located on the substrate.

Embodiments of the substrate include any substrate made of a glass or glass-ceramic, NiP/Al, metal alloys, plastic/polymer material, ceramic, glass-polymer, composite materials or other non-magnetic materials.

In one embodiment, the magnetic medium could have a coercivity of more than 2000 Oe, more preferably more than 3000 Oe, and most preferably more than 4000 Oe. The media could have a coercivity of 5000 Oe or more. The multilayer superlattice could comprise 5 to 100 bilayers of the magnetic layer and the non-magnetic layer, more preferably 10 to 80 bilayers, and most preferably 20 to 50 bilayers. The bilayers could be Co/Pd bilayers or Co/Pt bilayers or CoCr/Pd bilayers, or CoCrB/Pd bilayers. The magnetic layer could have a thickness of about 2 Å to about 10 Å, more preferably about 3 Å to about 8 Å, most preferably about 4 Å to about 6 Å. The non-magnetic layer could have a thickness of about 3 Å to about 20 Å, more preferably about 5 Å to about 15 Å, most preferably about 8 Å to about 12 Å. In one embodiment, the Si-containing seedlayer could have a thickness of about 50 Å. The seedlayer could advantageously be deposited at a total thickness of about 10 Å to about 500 Å, such as about 20 Å to about 250 Å, preferably about 25 Å to about 100 Å. The Si-containing seedlayer could be sputter deposited employing a target containing at least about 90 at. % of Si and, optionally, one or more elements such as B, W, Ta, Zr, P, Pd, Co, Cr, Ni and Nb. The magnetic recording medium could further comprise an underlayer between the Si-containing seedlayer or the means for boosting coercivity and the substrate. The underlayer could be NiFe, FeAl$_x$N$_y$, or FeAlSi. In a preferred embodiment of the magnetic recording medium, the substrate could be a glass substrate or an aluminum substrate, the magnetic layer could be a Co-containing layer and the non-magnetic layer could be a Pd-containing layer.

Embodiments of the present invention also comprises surface oxidizing a layer of the recording medium. A surface-oxidized layer is one having more than 0.5 at. % oxygen in a top 50 Å region after in-situ sputter removal of a 40 Å surface layer. In a preferred embodiment, the surface-oxidized layer has more than 10 at. % oxygen in the top 50 Å region after in-situ sputter removal of a 40 Å surface layer. The surface of the seedlayer itself could be oxidized.

Embodiments of the present invention also comprise forming an adhesion enhancement layer, such as Cr or Cr alloy or Ti or Ti alloy, between the underlayer and substrate above or below the seedlayer. An adhesion enhancement layer is a sputter-deposited thin film layer in the thickness range of 15 Å to 100 Å that creates a better adhesion between underlayer and substrate. In a preferred embodiment, the adhesion enhancement layer is a sputter-deposited thin film layer in the thickness range of 25 Å to 75 Å.

Embodiments of the present invention comprise sputter-depositing an adhesion enhancement layer that is substantially Cr or a Cr alloy. Suitable Cr alloys include Cr and up to about 30 at. %, e.g., up to about 20 at. % of an alloying element, such as titanium and vanadium. Advantageously, the present invention could be easily integrated into existing production facilities in a cost-effective manner, in that the adhesion enhancement and amorphous seedlayer could be sputter deposited.

Embodiments of the present invention also comprise a carbon-containing overcoat thereon, such as hydrogenated carbon. As in conventional practices, a lubricant topcoat could be applied on the carbon-containing overcoat.

Figure 2:
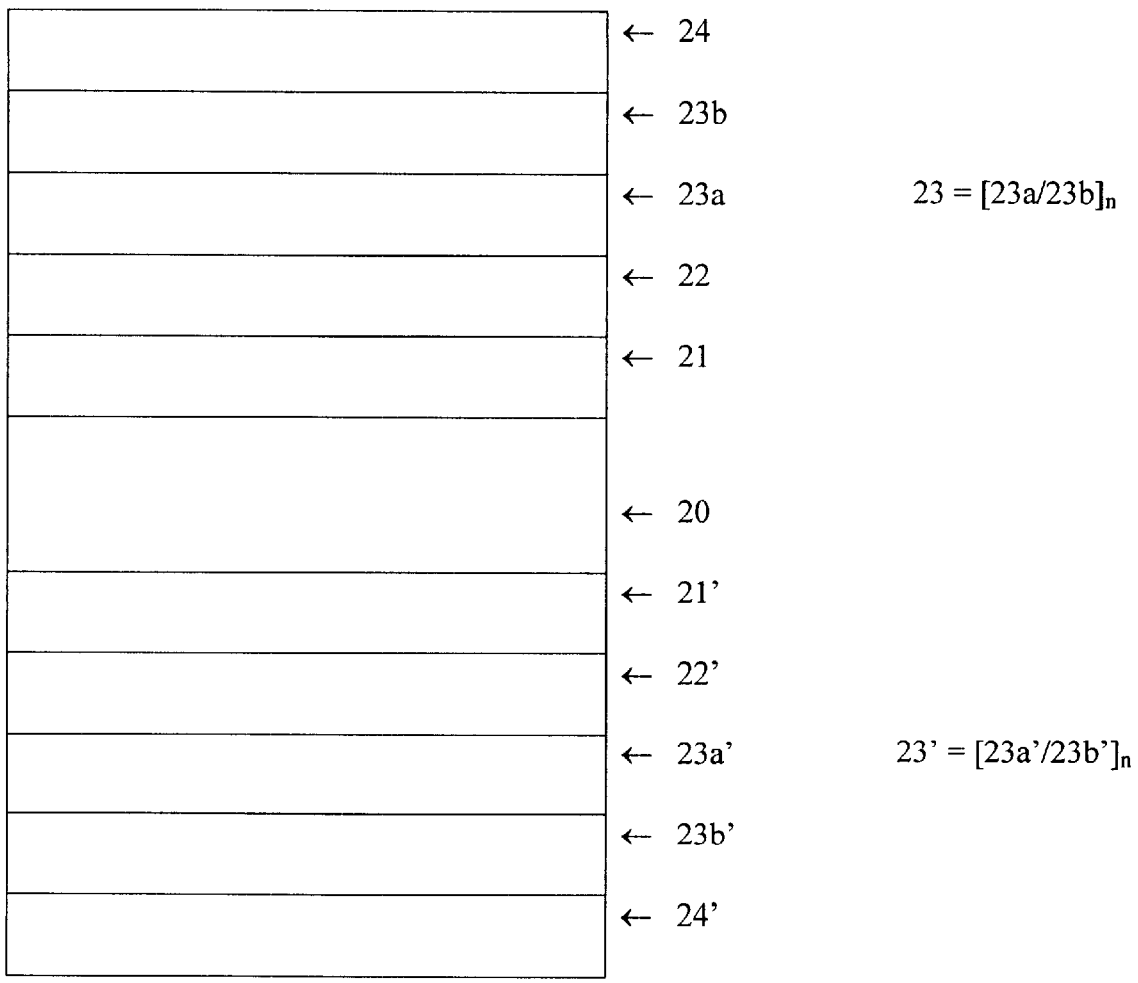
FIG. 2 schematically shows a magnetic recording medium structure comprising a superlattice multilayer in accordance with an embodiment of the present invention.

An embodiment of the present invention is schematically illustrated in FIG. 2 and comprises a substrate 20. Sequentially deposited on each side of substrate 20 is soft magnetic layer 21, 21', seedlayer 22, 22', multilayer superlattice 23, 23' comprising multiple bilayers of magnetic material 23a, 23a' and non-magnetic material 23b, 23b', and protective overcoat 24, 24'. Embodiments of the present invention also include a lubricant topcoat (not shown) deposited on protective overcoat 24, 24'.

Advantageously, the present invention could be conducted by sputter depositing the soft magnetic layer, the underlayer, the multilayer superlattice and protective overcoat in an in-line pass-by apparatus comprising a plurality of sequentially spaced sputtering chambers. In particular, the multilayer superlattice could be formed by sequentially depositing a magnetic layer and a non-magnetic layer to form multiple bilayers of the magnetic/non-magnetic layers.

EXAMPLES

All samples have [Co/Pd]n or [CoCr/Pd]n multilayer, wherein the bilayer number is n=20 and films were sputtered at 20 mtorr. All samples were fabricated with direct current (DC) magnetron sputtering except carbon films, which were made with alternative current (AC) magnetron sputtering. The cobalt thickness is 3 Å and Pd thickness is 10 Å. The seedlayer is a sputter deposited Si seedlayer. As the thickness of the Si seedlayer was increased from 0, 25, 50, 75, 100, 200, 300, to 500 Å, the coercivity of the medium with the (Co/Pd)n=20 multilayer increased from 2303 Oe, 2768 Oe, 3284 Oe, 3684 Oe, 3858 Oe, 4398 Oe, 4856 Oe to 5013 Oe, respectively. The higher Ar sputtering pressure at 30 mtorr could further increase the coercivity of media beyond 5013 Oe.

In order to show the material effect of seedlayer on Co/Pd multilayer, media having Si versus Pd, CoCr, CrW, NiNb, and NiP were compared. With seedlayer thickness fixed at 50 Å, the coercivity of [Co 3 Å/Pd 10 Å]n=20 multilayer, the coercivity of the media was found to be different with the use of different seedlayer materials. The coercivity of the multilayer disk on NiP/Al substrate was 2321 Oe for the disk without a seedlayer. With a Pd seedlayer of 50 Å thickness, the coercivity of the multilayer disk was 3214 Oe. With a Si seedlayer of 50 Å thickness, the coercivity of the multilayer disk was 4398 Oe. With a CoCr seedlayer of 50 Å thickness, the coercivity of the multilayer disk was 2013 Oe. With a CrW seedlayer of 50 Å thickness, the coercivity of the multilayer disk was 2095 Oe. With a NiNb seedlayer of 50 Å thickness, the coercivity of the multilayer disk was 1903 Oe. With a NiP seedlayer of 50 Å thickness, the coercivity of the multilayer disk was 1857 Oe. It was found that Si layer gives the highest coercivity for the Co/Pd multilayer disk. The Pd seedlayer also enhances the coercivity of the multilayer disk. However, the other sputtered thin film materials CoCr, CrW, NiNb, and NiP all have negative effects on the coercivity enhancement of [Co/Pd]n multilayer disk.

The effect of seedlayer material on Co/Pd multilayer disk on the glass substrate was also compared. A Si seedlayer was compared with seedlayers of Pd, CoCr, CrW, NiNb, and NiP. The coercivity of the multilayer disk on NiP/Al substrate is 2321 Oe for the disk without a seedlayer. With a Pd seedlayer of 50 Å thickness, the coercivity of the multilayer disk is 2808 Oe. With a Si seedlayer of 50 Å thickness, the coercivity of the multilayer disk is 4844 Oe. With a CoCr seedlayer of 50 Å thickness, the coercivity of the multilayer disk is 2419 Oe. With CrW seedlayer of 50 Å thickness, the coercivity of the multilayer disk is 2414 Oe. With a NiNb seedlayer of 50 Å thickness, the coercivity of the multilayer disk is 2135 Oe. With NiP seedlayer 50 Å, the coercivity of multilayer disk is 2123 Oe. It was found that the Si layer gives the highest coercivity for the Co/Pd multilayer disk on the glass substrate. The Pd seedlayer also enhances coercivity of the multilayer disk. However, the other sputtered thin film materials CoCr, CrW, NiNb, and NiP all have negative effects on the coercivity enhancement of [Co/Pd]n multilayer disk on the glass substrate.

While the above examples were done without the use of a soft magnetic material interposed between the substrate and the seedlayer, the use of a soft magnetic material could further improve the coercivity of the medium.

What is claimed is:

1. A magnetic recording medium comprising:
   a substrate;
   a multilayer superlattice comprising 5–100 bilayers of a magnetic layer and a non-magnetic layer; and
   a Si-containing seedlayer interposed between the underlayer and the multilayer superlattice, wherein the magnetic recording medium has a coercivity of more than 2000 Oe.

2. The magnetic recording medium according to claim 1, wherein the bilayers are Co/Pd bilayers or Co/Pt bilayers.

3. The magnetic recording medium according to claim 1, wherein the magnetic layer has a thickness of about 2 Å to about 10 Å.

4. The magnetic recording medium according to claim 1, wherein the non-magnetic layer has a thickness of about 3 Å to about 20 Å.

5. The magnetic recording medium according to claim 1, wherein the Si-containing seedlayer has a thickness of about 50 Å.

6. The magnetic recording medium according to claim 1, further comprising an underlayer between the Si-containing seedlayer and the substrate.

7. The magnetic recording medium according to claim 6, wherein the underlayer is selected from the group consisting of NiFe, FeAl$_x$N$_y$ and FeAlSi.

8. The magnetic recording medium according to claim 1, wherein the substrate is a glass substrate or an aluminum substrate, the magnetic layer comprises a Co-containing layer and the non-magnetic layer comprises a Pd-containing layer.

9. A method of manufacturing a magnetic recording medium, the method comprising:
   sputter depositing a Si-containing seedlayer on a substrate; and
   sputter depositing a multilayer superlattice comprising 5–100 bilayers of a magnetic layer and a non-magnetic layer, wherein the magnetic recording medium has a coercivity of more than 2000 Oe.

10. The method of claim 9, wherein the bilayers are Co/Pd bilayers or Co/Pt bilayers.

11. The method of claim 9, wherein the magnetic layer has a thickness of about 2 Å to about 10 Å.

12. The method of claim 9, wherein the non-magnetic layer has a thickness of about 3 Å to about 20 Å.

13. The method of claim 9, wherein the Si-containing seedlayer has a thickness of about 50 Å.

14. The method of claim 9, further comprising sputtering an underlayer between the Si-containing seedlayer and the substrate.

15. The method of claim 14, wherein the underlayer is selected from the group consisting of NiFe, FeAl$_x$N$_y$ and FeAlSi.

* * * * *